Nov. 10, 1953    R. H. BROWN    2,658,594
TORQUE CONVERTER
Filed April 18, 1950    2 Sheets-Sheet 2
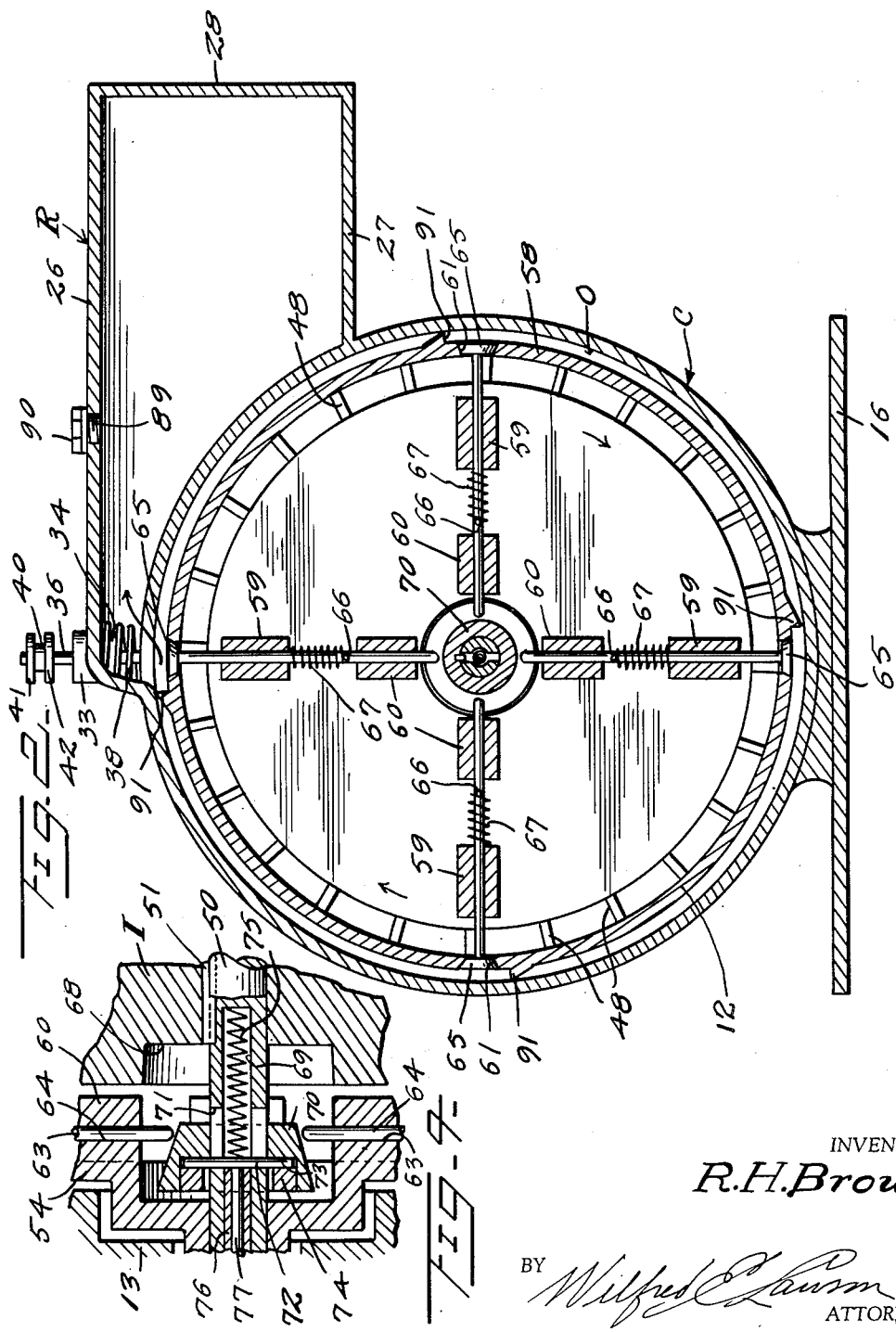

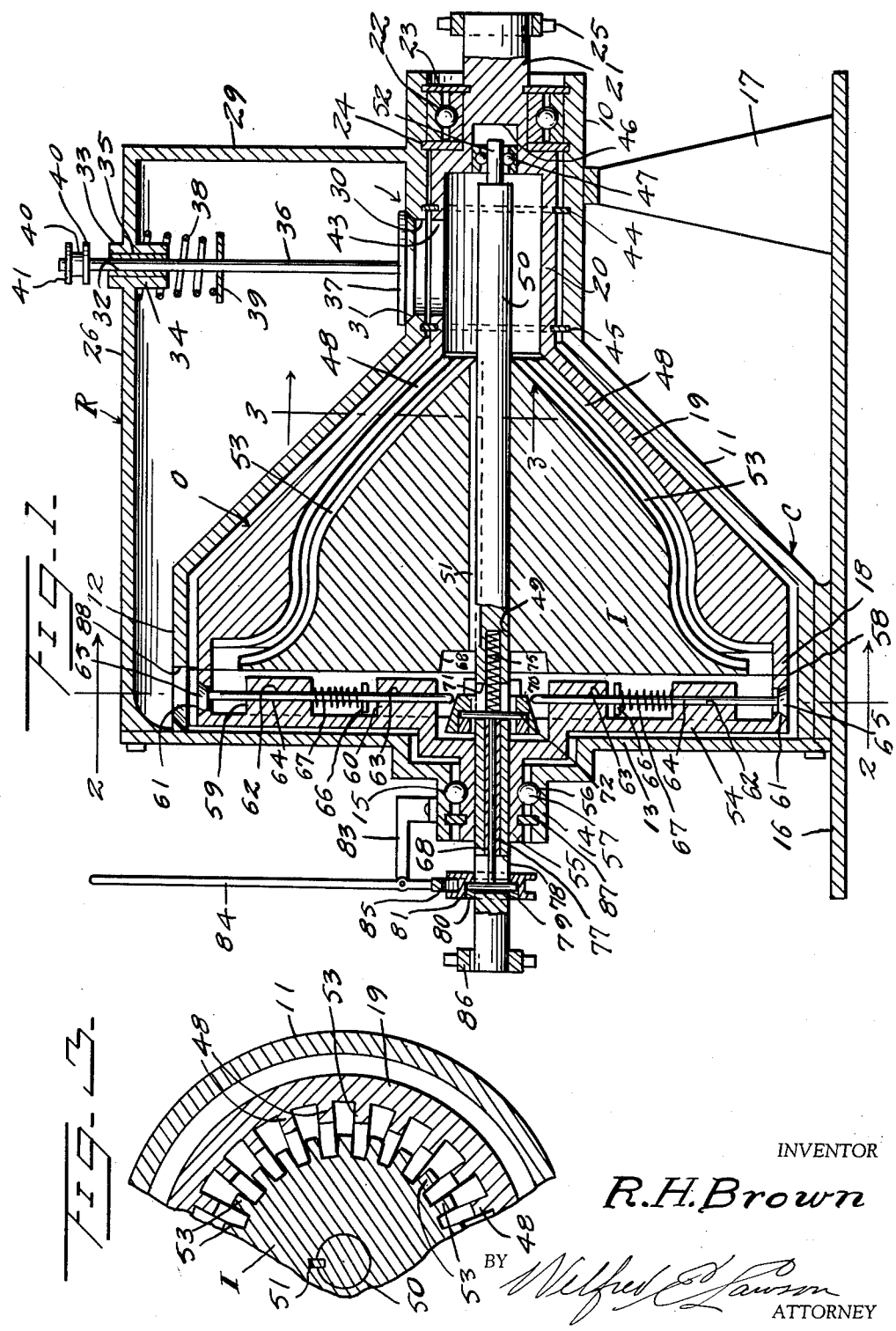

Patented Nov. 10, 1953

2,658,594

UNITED STATES PATENT OFFICE 2,658,594

TORQUE CONVERTER

Robert H. Brown, Pulaski, Tenn.

Application April 18, 1950, Serial No. 156,705

1 Claim. (Cl. 192—58)

This invention relates to torque converters and more particularly to torque converters adapted to be disposed in horizontal working position.

The primary object of the invention is to provide a torque converter of the character indicated above comprising an inner rotary member and an outer rotary member, each of said members being adapted to be used selectively as the driving or the driven member.

Another object of the invention is to provide a torque converter of the character indicated above the two members of which are assembled one within the other and are adapted to be rotated independently from each other.

A further object of the invention is to provide a torque converter of the character indicated above the assembled rotary members of which are rotatably mounted in a casing connected with a reservoir adapted to contain a fluid, such as oil, and adapted to communicate with the space between the inner and the outer rotary members through a normally closed inlet valve arranged in the wall common to the reservoir and the casing and a plurality of openings provided in the outer wall of the outer rotary member, and through an outlet opening provided in the wall common to the reservoir and the housing and a plurality of normally closed outlet valves arranged in the peripheral wall of the outer rotary member.

An additional object of the invention is to provide a torque converter of the character indicated above the torque ratio between the driven and the driving member of which is adapted to be regulated by adjusting the inlet and outlet valves.

Another object of the invention is to provide a torque converter of the character indicated above the driven rotary member of which is adapted to be started quickly by or to be released quickly from the driving member.

The invention consists in the details of construction and in the combination and arrangement of the several parts of my improved torque converter whereby certain advantages are attained, as will be hereinafter more fully set forth.

In order that my invention may be better understood, I will now proceed to describe the same with reference to the accompanying drawings, wherein:

Figure 1 is a view in section taken on the longitudinal center plane of a torque converter in accordance with the invention;

Figure 2 is a view in section taken on the line 2—2 in Figure 1;

Figure 3 is a view in section taken on the line 3—3 in Figure 1; and

Figure 4 is a fragmentary detail view in an enlarged scale of the means for adjusting the outlet valves.

The torque converter as herein embodied comprises a casing C one end portion of which, hereinafter called the front end portion 10, is substantially tubular. The intermediate portion 11 of the peripheral wall of the casing C extends conically from the front end portion 10 and the rear end portion 12 of said wall extends rearwardly parallel to the axis of the casing C. The casing C has a removable rear wall 13 secured to and extending at right angles to the rear end portion 12 of the peripheral wall of the casing and centrally of the rear wall 13 a rearwardly extending tubular flange 14 is formed on said rear wall and communicates with the interior of the casing C. A ball race 15 is formed in the inner surface of the tubular flange 14 intermediate the ends thereof.

A base plate 16 is formed on the rear end portion 12 of the peripheral wall of the casing C. The bottom surface of said base plate extends parallel to the longitudinal axis of the casing and the base plate is adapted to support said casing. A pair of legs 17 extend between the front end portion 10 of the peripheral wall of the casing C and the base plate 16.

An outer rotary member O has an annular rear end portion 18, a conical intermediate portion 19 and a cylindrical front end portion 20. A stub shaft 21 is formed on the front end portion 20 and extends coaxially forward therefrom.

A ball bearing 22 is inserted in the tubular front end portion 10 of the casing C and the stub shaft 21 extends rotatably through said ball bearing 22 so that the outer rotary member O is rotatably supported by the ball bearing 22.

Forwardly and rearwardly of the ball bearing 22, oil retaining rings 23 and 24 respectively are arranged between the tubular front end member 10 of the casing C and the stub shaft 21 of the outer rotary member O. On the forward end portion of the stub shaft 21 extending beyond the tubular front end portion 10 a gear 25 or the like is rigidly mounted. The hollow cylindrical front end portion 20 of the outer rotary member O extends rearwardly through the tubular front end portion 10 of the casing C, the conical intermediate portion 19 of the outer rotary member extends parallel to the intermediate portion 11 of the casing C and is spaced therefrom, and the annular rear end portion 18 of the outer rotary member O extends parallel to and is spaced from the rear end portion 12 of the casing.

A reservoir R is formed on or secured to the upper portion of the casing C and has a top wall 26, a bottom wall 27, a side wall 28, and an end wall 29. The end wall 29 extends upwardly from the wall of the tubular front end portion 10 of the casing C and the wall of said front end portion 10 forms a part of a wall common to the reservoir R and the casing C dividing them from each other.

In the tubular front end portion 10 an inlet valve opening 30 is provided, the outer edge of which is beveled to form a valve seat 31. In the top wall 26 of the reservoir R a hole 32 is provided coaxially with the inlet valve hole 30.

An outwardly extending annular flange 33 and an inwardly extending annular flange 34 are formed on the top wall 26 and surround the hole 32. A bushing 35 is inserted in the hole 32 and a valve stem 36 extends slidably through said bushing. An inlet valve head 37 is secured to the inner end portion of the valve stem 36 and is adapted to engage the valve seat 31. A helical spring 38 surrounds the inner annular flange 34 and the valve stem 37, and the outer end portion of said spring abuts the inside surface of the top wall 26 while the inner end portion of the spring 38 engages a disc 39 mounted rigidly on the valve stem 36, thereby normally urging the valve head 37 into valve closing position. A spool 40 having end flanges 41 and 42 respectively, is rigidly mounted on the upper end portion of the valve stem 36 extending outwardly of the guide bushing 35.

A plurality of inlet holes 43 are provided in the peripheral wall of the hollow cylindrical front end portion 20 of the outer rotary member O and said holes 43 are of the same diameter as the inlet valve hole 30 and are arranged equidistantly from each other so that they will be arranged coaxially with the valve hole 30 when passing under said hole.

An oil retaining ring 44 is disposed between the tubular front end portion 10 and the hollow cylindrical front end portion 20 in front of the inlet holes 43 and a similar ring 45 is disposed between the two front end portions rearwardly of said holes.

A hollow 46 extends coaxially into the stub shaft 21 from the end of the bore of the hollow cylindrical front end portion 20 and a ball bearing 47 is inserted in said hollow 46.

On the inner surface of the conical intermediate portion 19 of the outer rotary member O a plurality of axially extending equidistantly spaced vanes 48 are formed.

An inner rotary member T is formed substantially conical and is adapted to be arranged inside the outer rotary member O. A bore 49 extends centrally through the inner rotary member T and a shaft 50 extends through said bore 49 and the inner rotary member T is secured to said shaft 50 by means of a key 51, or the like. The shaft 50 extends forwardly beyond the inner rotary member T, and the foremost end portion of said shaft 50 is reduced as at 52 and is rotatably supported by the ball bearing 47 when the inner rotary member T is disposed in working position in the outer rotary member O. A plurality of coaxially extending equidistantly spaced vanes 53 are formed on the peripheral surface of the inner rotary member T and are shaped so that they can pass the vanes 48 on the outer rotary member O.

A rear cover 54 is removably secured to the annular rear end portion 18 of the outer rotary member O and has a centrally located tubular portion 55 extending rearwardly therefrom and through the tubular flange 14 on the casing C. A ball race 56 is formed in the inner surface of the tubular end portion 55 oppositely to the ball race 15 and a plurality of balls 57 are disposed in the two cooperating ball races.

An annular flange 58 is formed on the peripheral edge of the rear cover 54 so that the forward surface of said flange abuts the rear surface of the annular rear end portion 18.

Another annular forwardly extending flange 59 is formed coaxially with the flange 58 on the cover 54 and a third annular flange 60 is formed on the front surface of the cover 54 coaxially with the axis of the tubular portion 55. A plurality of countersunk outlet valve holes 61 are provided equidistantly from each other in the annular flange 58. In the flange 59 a plurality of guide bores 62 are provided coaxially with the outlet valve holes 61 and in the flange 60 a plurality of guide bores 63 are arranged coaxially with the guide bores 62.

In each pair of coaxial bores 62 and 63 a valve stem 64 is slidably disposed. On the outer end portion of each valve stem 64 an outlet valve head 65 is mounted and is adapted to engage the corresponding countersunk valve hole 61. Adjacent to the annular flange 60 and between this flange and the annular flange 59 a stop pin 66 extends through each valve stem 64 and a helical spring 67 surrounding each of these stems abuts the annular flange 59 with one of its end portions and the stop pin 66 with the other end portion, urging the valve head 65 in engagement with the valve seat formed by the hole 61. The inner end portion of each valve stem 64 extends into the space surrounded by the annular flange 60 and is rounded.

A counterbore 68 is provided in the rear surface of the inner rotary member T and a bore 69 extends into the shaft 50 from its rear end. A conical sleeve 70 is mounted slidably on the shaft 50, which is provided with a longitudinal slot 71 extending diametrically through said shaft. A pin 72 extends through the slot 71 and is located in a counterbore 73 extending into the conical sleeve 70 from its larger rear end surface. A stop ring 74 is pressed into the counterbore 73 securing the pin 72 in position. A helical spring 75 disposed in the forward end portion of the bore 69 in the shaft 50 urges the pin 72 against the rear end of the slot 71. A guide bushing 76 is inserted in the rear end portion of the bore 69 and a push rod 77 is arranged slidably in said guide bushing. The forward end of said push rod 77 abuts the pin 72.

The shaft 50 extends rearwardly beyond the tubular flange 14 of the casing C and a longitudinal slot 78 is provided in said shaft rearwardly of said flange and extends diametrically through said shaft. A pin 79 extends through the slot 78 and the end portions of the pin 79 are located in a counterbore 80 provided in the rear surface of a spool 81 slidably mounted on the shaft 50. A plug ring 82 in the counterbore 80 secures the pin 79 in position. The rear end of the push rod 77 abuts the pin 79 under the pressure of the helical spring 75.

A bracket 83 is secured to the peripheral surface of the tubular flange 14 of the casing C and extends rearwardly therefrom. A hand lever 84 is pivotally connected with the bracket 83 and has a bifurcated inner end portion 85 engaging the spool 81 so that said spool can be moved lengthwise on the shaft 50 by manipulating the hand lever 84. When said hand lever 84 is pivoted to move the spool 81 forwardly on the shaft 50 the push rod 77 urges the conical sleeve 70 forwardly engaging the valve stems 64 and forcing them to slide outwardly and to unseat the valve heads 65.

On the rear end portion of the shaft 50 a gear 86 is rigidly mounted and an oil retaining ring 87 is arranged between the tubular flange 14 of the casing C and the rearwardly extending tubular portion 55 of the rear cover 54 rearwardly of the ball races 15 and 56.

The top wall 26 is tightly connected with the removable rear wall 13 of the casing C and an opening 88 is provided in the rear end portion 12 of the peripheral wall of the outer rotary member O. This opening 88 is disposed so that it will be coaxial with the outlet valve openings 61 passing under it when the inner rotary member T is rotated.

A filling opening 89 is provided in the top wall 26 of the reservoir R to permit said reservoir to be filled with a suitable fluid such as oil. A plug 90 is adapted to be inserted into the inlet 89 to prevent entrance of foreign matter and to reduce evaporation of liquid.

The above described torque converter can be used by optionally utilizing the outer rotary member O or the inner rotary member T as driving member. The selected member is connected with a source of power (not shown) actuating the gear mounted on the shaft of the selected member. Then the inlet valve 37 is opened by manipulating the spool 40 by means of a hand lever (not shown). Oil flows from the reservoir into the space between the inner and the outer rotary member and the oil is forced by the vanes on the driving member to flow in circular motion. The oil transfers this motion to the driven member by pressing against the vanes of said driven member.

The ratio of torque set up between the two rotary members and the speed of the driven member can be regulated by opening inlet valve 37 and the outlet valves 65 to a certain degree and the desired degree of opening of the outlet valves 65 is attained by manipulating the hand lever 84 to adjust the position of the conical sleeve 70.

The driven member is adapted to be stopped without stopping the driving member by closing the inlet valves 37, whereby the flow of oil into the space between the driven and the driving member is interrupted and the oil in said space is forced by centrifugal force through the outlet valves 65 and the outlet opening 88 into the reservoir. Any oil collecting between the casing C and the outer rotary member O or the rear end cover of said member is prevented from leaking out by the oil retaining rings 23, 24, 44, 45 and 87.

In order to assist the flow of oil through the outlet opening 88 and to clean out any oil left in the casing C a scoop 91 is formed on the peripheral surface of the flange 58 adjacent to each outlet valve hole 61 in counterclockwise direction as shown best in Figure 2.

From the foregoing description it is thought to be obvious that an improved torque converter constructed in accordance with the present invention is particularly well adapted for use by reason of the convenience and facility with which it may be assembled and operated.

I claim:

In a torque converter, a casing of substantially conical form having its apex end terminating in a hollow cylindrical extension, a fluid reservoir extending laterally from the upper sides of said casing and the cylindrical extension, a hollow substantially conical outer rotary member having a hollow cylindrical hub extending from its apex end into the first extension, a shaft extending axially through said casing and said hub, a second substantially conical member within the first member and splined on said shaft for rotation therewith relatively to the latter member, a plurality of vanes on the opposed surfaces of said members, said hub having a circumferential series of ports to establish communication between the same and said reservoir through an outlet port in the first extension for the passage of the fluid into and through the hub to said vanes, a control valve for said outlet port, the opposite end of the first member being closed by an end wall spaced from the adjacent end of said second member to form a fluid receiving chamber therebetween, said chamber having a circumferential series of outlet ports to establish communication between the same and the interior of said casing which is provided with an inlet port for the return of the fluid to the reservoir, a radially movable valve for controlling the discharge of the fluid from the chamber through each of said outlet ports, means on said shaft for actuating said radially movable valves, and selective means for driving said members one relative to the other.

ROBERT H. BROWN.

References Cited in the file of this patent

UNITED STATES PATENTS

| Number | Name | Date |
|---|---|---|
| 1,136,168 | Rich | Apr. 20, 1915 |
| 1,191,231 | Rich | July 18, 1916 |
| 1,203,265 | Radcliffe | Oct. 31, 1916 |
| 1,940,918 | Petroni et al. | Dec. 26, 1933 |
| 2,088,818 | Skinner | Aug. 3, 1937 |
| 2,466,431 | Jendresen | Apr. 5, 1949 |